United States Patent
Sekida

[15] 3,638,547
[45] Feb. 1, 1972

[54] FILM WINDING APPARATUS IN CAMERA WITH INTERCHANGEABLE FILM BACK

[72] Inventor: Minoru Sekida, Sakai, Japan

[73] Assignee: Minolta Camera Kabushiki Kaisha, Minamiku, Osaka, Japan

[22] Filed: Aug. 4, 1969

[21] Appl. No.: 847,233

[30] Foreign Application Priority Data

Aug. 16, 1968 Japan....................................43/71043
Oct. 25, 1968 Japan....................................43/78101
Apr. 23, 1969 Japan....................................44/31618

[52] U.S. Cl.................................................95/31 R, 95/34 R
[51] Int. Cl.................G03b 19/04, G03b 17/42, G03b 1/62
[58] Field of Search.......................95/34, 31; 242/71.1, 71.4

[56] References Cited

UNITED STATES PATENTS

2,911,894  11/1959  Hennig et al..........................95/34 X
3,253,526  5/1966  Steisslinger..............................95/31
3,451,322  6/1969  Noda et al. ..............................95/31

Primary Examiner—Samuel S. Matthews
Assistant Examiner—Russell E. Adams, Jr.
Attorney—Stanley Wolder

[57] ABSTRACT

A film winding apparatus comprises a reciprocal rotation member in a film back which is rotated interrelatedly with a winding knob in a camera body, a ratchet wheel to drive a film winding spool in the film back, a clutch pawl provided on the rotation member and another ratchet wheel which causes the clutch pawl to engage with or disengaged from the ratchet wheel for film winding. With the use of this apparatus the film back can be mounted on the camera body irrespective of the state of shutter and film before or after effecting exposure. The apparatus also includes means for making multiple exposures.

10 Claims, 9 Drawing Figures

Inventor
MINORU SEKIDA
By Stanley Wolder
Attorney

Inventor
MINORU SEKIDA
By Stanley Walker
Attorney

FILM WINDING APPARATUS IN CAMERA WITH INTERCHANGEABLE FILM BACK

The present invention relates to an apparatus for winding a film in a camera with interchangeable film back, and more particularly to a film winding apparatus to be used in a camera with a film-loaded film back which is detachably mounted in the camera body so that the film back may be interchanged as desired, the film winding apparatus being adapted to effect film winding in operative relationship with shutter setting so as to make the shutter ready for release action.

In order to avoid double exposure or transport of unexposed film, a conventional camera of this type includes an arrangement for attaching a film back to the camera body which is so adapted that when the shutter in the body is in cocked position the film in the film back has already been wound up and is ready for taking a photograph, while in case where the shutter is in released position the film back cannot be mounted on the body unless the film in the film back has been wound up. Thus, in accordance with such structure, desired multiple exposures can not be effected. Another structure has also been proposed in which, when the film back is mounted on the body, the shutter, so long as it is in cocked position, is ready for effecting exposure regardless of whether the film has been wound up or not, with a resultant disadvantage that the film is subjected to an inadvertent double exposure even when it is not in correct position for exposure or the film may be wound up without exposure, hence there is a need to ascertain the position of the shutter in the body as well as the condition of the film in the film back. Therefore, the cameras of both of these types are extremely complex and difficult to handle properly.

An object of the present invention is to improve the film winding mechanism of a film back in a camera having an interchangeable film back in which a film is wound up simultaneously with shutter setting operation and to thereby provide an epochmaking apparatus for winding a film which permits the film back to be mounted on the body irrespective of the state of shutter and film before or after exposure and which is free from erroneous operations such as a double exposure or film transport without exposure regardless of what condition the shutter and film may respectively take before or after exposure, the film winding apparatus further being capable of effecting multiple exposures by intentional but simple manipulation when desired.

A common advantage of a camera with an interchangeable film back is that two film backs, one carrying a monochrome film and the other a color film, can be used, for instance, on one camera, each being used as desired depending upon the purpose. The present invention has fulfilled the foregoing object and enables the camera with interchangeable film back to exhibit its advantages to full extent.

The present invention will hereinafter be described in detail with reference to the accompanying drawings, in which.

Figure 1:
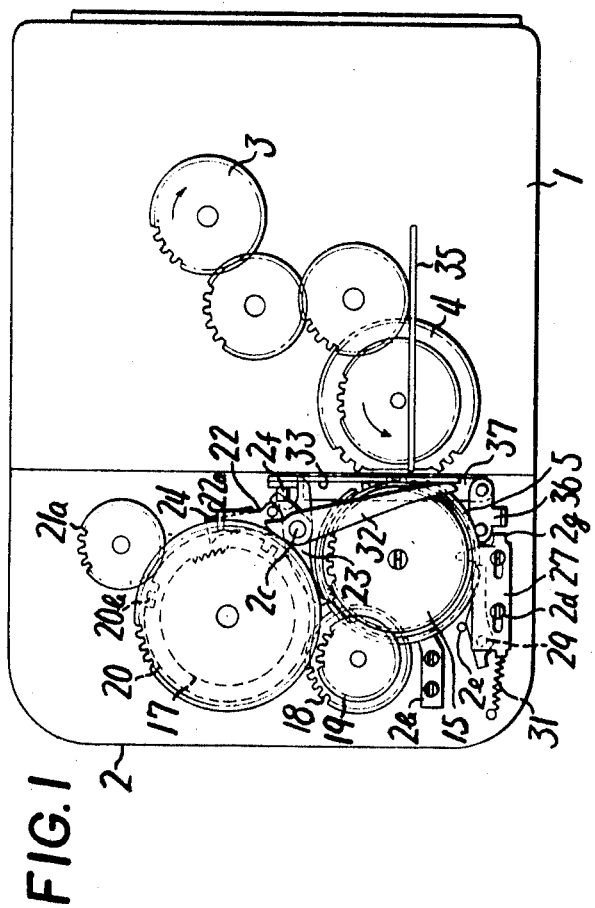
FIG. 1 is a plan view schematically showing an embodiment of the present invention.
Figure 2:
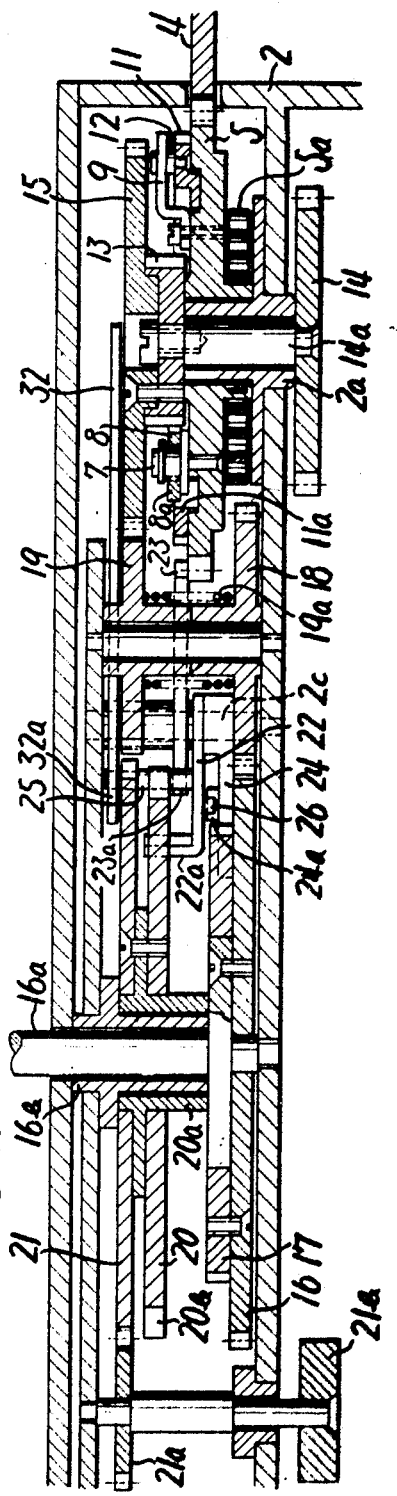
FIG. 2 is a development in vertical section of a gear mechanism taken along planes passing through respective gear axes.

Referring to the drawings, designated at 1 is a camera body and at 2, a film back which is detachably mounted on the body by means of a conventional structure. As already known, the body 1 is provided with a winding knob (not shown) by which a charge gear 3 is turned a definite angle in the direction of an arrow in FIG. 1 to bring the shutter into cocked position while giving a turn of rotation to a partly toothed gear 4 through an intermediate idle gear.

Rotatably mounted around a bush 2a fixed to the film back 2 is a clutch gear 5 which faces a toothless portion 4a of the gear 4. The gear 4, when initiated into rotation, brings the clutch gear 5 into rotation in meshing engagement therewith and, upon one revolution, releases the gear 5 from the meshing engagement. In order to ensure smooth initiation of meshing engagement with the gear 4, a tooth of the clutch gear 5 which faces the toothless portion 4a when at rest is cut out.

Acting on the clutch gear 5 is a spiral spring 5a with one end fixed to the boss of gear 5 and with the other end to the film back 2, the clutch gear 5 thus being forced to be rotated counterclockwise all the time. On the rear face of the clutch gear 5 there is provided a stopper pin 6 to be brought into contact with a stopper 2b fixed to the film back 2 so as to determine the position where the clutch gear 5 is to be stopped when returned by the spring 5a. Accordingly, when the gear 4 begins to revolve, the clutch gear 5 meshing therewith is initiated into clockwise rotation to wind up the spiral spring 5a and when the meshing engagement is released after one revolution of the gear 4, the clutch gear 5 is allowed to return in counterclockwise direction by the action of the spiral spring 5a until the stopper pin 6 is brought into contact with the stopper 2b to halt the clutch gear 5. Based upon the relationship with a multiple exposure mechanism to be later described, the clutch gear 5 of the present embodiment is adapted to turn about 310° for each revolution of the gear 4.

The clutch gear 5 is further formed with an annular recess in its surface to receive a ratchet wheel 11 with teeth formed on the outer periphery of an annular member for engaging or disengaging the clutch, the clutch gear 5 and the ratchet wheel 11 being disposed concentrically and adapted for free rotation relative to each other. Provided in a portion on the clutch gear 5 on the inner diameter side of the ratchet wheel 11 is a pin 7 to support a clutch pawl 8. By means of a spring 10, the clutch pawl 8 is urged clockwise for pivotal movement, with its tail end 8a facing the inner cylindrical surface of the ratchet wheel 11. At a portion of the inner cylindrical surface of the ratchet wheel 11 a recess 11a *for engagement with the tail end 8a* of the clutch pawl 8 is formed so that, at the time when film winding operation to be described later is initiated, the tail end 8a may be brought into engagement with the recess 11a with the other end of the clutch pawl 8 in engagement with a ratchet wheel 13 for transmitting winding action, while when the tail end 8a is pushed out of recess 11a into sliding contact with the inner cylindrical surface the clutch pawl may be left disengaged from the ratchet wheel 13.

Figure 3:
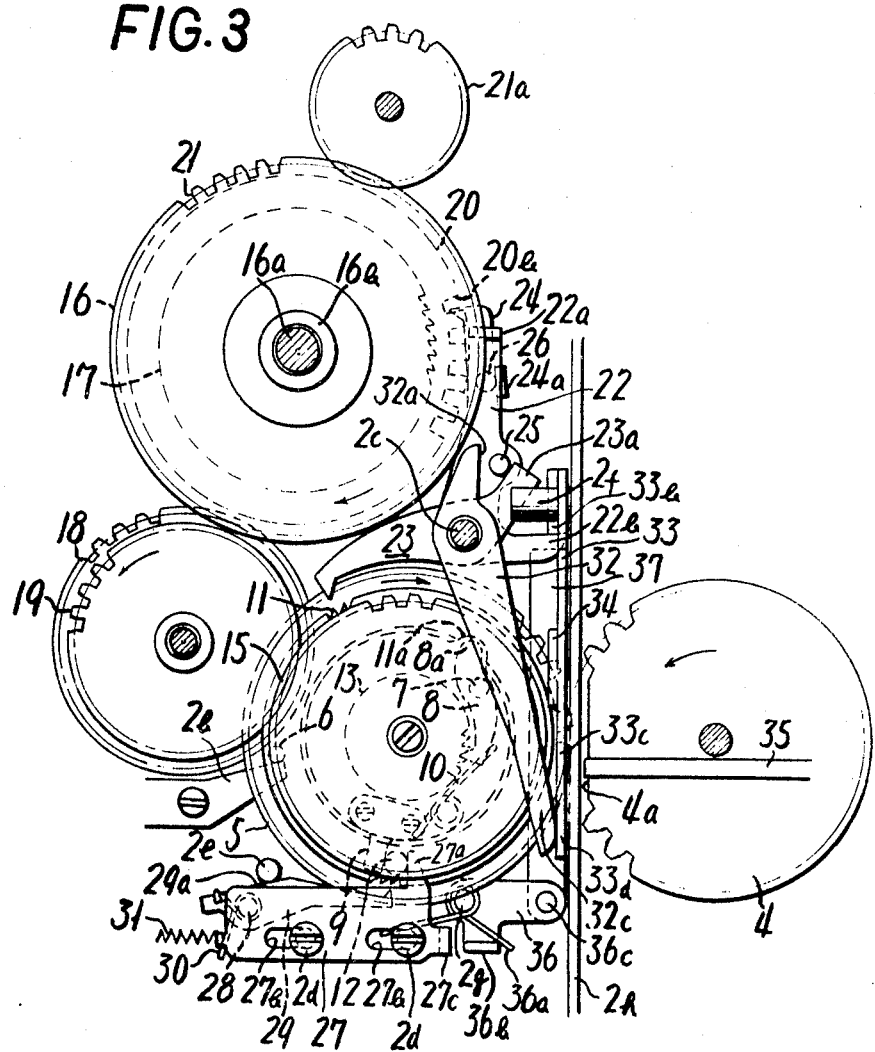
FIG. 3 is a plan view showing the details of a principal mechanism.

The ratchet wheel 11 for engaging or disengaging the clutch is provided on its surface with a pin 12 to be brought into contact with a stopper 9. The stopper 9 and pin 12 serve to determine the position where the tail end 8a is to be engaged with the recess 11a in the ratchet wheel 11. After the clutch gear 5 has been rotated upon film winding operation and the ratchet wheel 11 as seen in FIG. 3 has also been turned clockwise to a certain extent or by a predetermined angle, the clutch gear 5 is returned in counterclockwise direction under the action of spiral spring 5a. At this time, the stopper 9 on the clutch gear 5 pushes forward the pin 12 on the ratchet wheel 11 to return the ratchet wheel 11 counterclockwise together in its restoring movement, whereupon the tail end 8a comes into engagement with the recess 11a in the ratchet wheel 11. Thus, the stopper 9 and pin 12 also serve to effect this returning movement. While the ratchet wheel 11 is thus associated with the stopper 9 through its pin 12, the rotatable angle of the ratchet wheel 11 relative to the clutch gear 5 is so designed that it is greater than the rotatable angle of the clutch gear 5, whereby, when multiple exposures are to be effected, the ratchet wheel 11 alone is made to revolve a desired angle on the gear 5 to force the tail end 8a out of the recess 11a thus moving the pawl 8 out of the engagement with the ratchet wheel 13 for transmitting winding action. The rotatable angle of the ratchet wheel 11 in this embodiment is approximately 330° with respect to the clutch gear 5.

The ratchet wheel 13 is supported on the inner hole of the bush 2a for rotatably supporting the clutch gear 5 and fixedly mounted on the upper end of a gear shaft 14a for turning a spool which is adapted to revolve independently of the clutch gear 5, the ratchet wheel 13 being adapted to be rotated together with a gear 14 for turning a spool (not shown) for film transport. The ratchet wheel 13 is formed on its outer periphery with teeth for engagement with the clutch pawl 8. While the clutch pawl 8 is in engagement with the ratchet wheel 13, the clutch gear 5, upon being turned clockwise together with the ratchet wheel 11, rotates the ratchet wheel 13 clockwise and further rotates the film winding spool through the gear 14 to advance the film. During the returning movement of the clutch gear 5, the tip of clutch pawl 8 slips on the teeth of the ratchet wheel 13 leaving the spool turning shaft 14a undisturbed. Furthermore, when the film is to be wound up by turning the film winding knob (not shown) in the film back to be described later, the clutch pawl 8, though in engagement with the ratchet wheel 13, slips on the teeth of the ratchet wheel 13 and the clutch gear 5 does not rotate accordingly. Thus, a so-called one-way rotational clutch mechanism is provided for effecting the rotation of the shaft 14a, gear 14 and ratchet wheel 13. In addition, in the case where the clutch pawl 8 is disengaged from the ratchet wheel 13, the ratchet wheel 13 and gear 14 are made quite independent of the rotation of the clutch gear 5.

The ratchet wheel 13 is further provided on the upper surface with a second gear 15 for winding up the film which is fixed thereto and adapted to be rotated concentrically therewith. In meshing engagement with the second gear 15 is a second idle gear 19. On the other hand, a film winding shaft 16a is directly connected with a film winding knob (not shown) in the film back and supported by a bush 16b fixedly mounted in the film back 2. A first gear 16 for film winding is keyed to the shaft 16a. Thus, by turning the film winding knob, the first gear 16 as seen in FIG. 3 is turned clockwise. Meshing with the first gear 16 is a first idle gear 18 which is supported on the same shaft as the second idle gear 19, with a kick spring 19a connecting the first idle gear 18 to the second idle gear 19. In this manner a one-way clutch mechanism is provided for delivering the torque of the first idle gear 18 only to the second idle gear 19. That is to say, the arrangement is such that when the winding knob in the film back is turned, the torque is delivered from the first film winding gear 16 through the first idle gear 18, kick spring 19a, the second idle gear 19 to the second film winding gear 15 and further from this gear to the spool turning gear 14 by way of the film winding shaft 14a, whereas the torque of the second idle gear 19 is not transmitted to the first idle gear 18. The first gear 16 is fixed with a ratchet wheel 17 to be rotated concentrically therewith for halting winding action.

Designated at 20 is an operation plate fixed to a bush 20a rotatably fitted around a bush 16b supporting the film winding shaft 16a, the operation plate being adapted to be rotated together with a counter gear 21 meshing with a friction roller gear 21a to be driven by a friction roller 21b which revolves interrelatedly with the film transport. The counter gear 21 is therefore designed to rotate by a definite angle upon the film being advanced a predetermined distance, i.e., the length of one frame of the film.

The operation plate 20 has a suitable number of cutout portions 20b along its outer periphery. As already known, a bent end portion 22a of an operation lever 22 is disposed close to the outer periphery of the plate 20. When the film has been advanced by the predetermined dimension, the bent end portion 22a of the lever 22 moves into the cutout portion 22b to halt the film transport, while upon exposure the bent end 22a is disengaged from the cutout portion to allow the film to advance.

The operation lever 22 is pivoted at its base on a pin 2c fixed to the film back 2 and by means of a spring 22c the bent end portion 22a is always urged in such direction that it may be caught in the cutout portion 20b. When set in the position to permit the transport of film, the bent end 22a is as already known held released from the cutout portion 20b by a member (not shown) associated with film transport.

Also supported on the pin 2c are a pawl 23 to be engaged with teeth on the outer periphery of the ratchet wheel 11 and another pawl 24 mating with the ratchet wheel 17 for halting winding action. The pawls 23, 24 are provided with springs (not shown) acting thereon so that the pawl tips may be urged into engagement with ratchet wheels 11 and 17 respectively. Disposed on the operation lever 22 are pins 25 and 26 with which the tail end 23a of the pawl 23 and the bent portion 24a of the pawl 24 may be brought into engagement under the action of the springs respectively acting on the pawls 23, 24. As a result, when a predetermined length of film is advanced, the pawls 23 and 24 are urged, interrelatedly with the action of the operation lever 22, into engagement with the ratchet wheel 11 and 17 respectively to prevent the ratchet wheels 11 and 17 from revolving toward the film winding direction, while when the shutter is released or upon the completion of taking a photograph, the pawls are turned together with the operation lever 22 so as to free the above-mentioned engagement. Unless the film is advanced, the operation lever 22, pawls 23 and 24 are retained in the positions shown in FIG. 3. (Since the action of the lever 22 is effected by the already known mechanism in this type of camera, the explanation as well as drawing of the mechanism will be omitted.)

Designated at 27 is a multiple exposure plate to be used when it is desired to make double or multiple exposures. The plate has, at its end, a projection 27a serving as a stopper for the pin 12 on the ratchet wheel 11. While film winding is not made as illustrated in FIG. 3, the pin 12 is held pinched between the projection 27a and the stopper 9 secured to the clutch gear 5 so as to limit the position of the ratchet wheel 11 in its counterclockwise rotation.

It will be seen in the drawings that the multiple exposure plate 27 receives in its slit 27b a stepped screw 2d driven into the film back 2, so that the plate, guided by the screw 2d, can be moved laterally, the plate further being urged leftward all the time by a pulling spring 31 which is weaker than the spiral spring 5a acting on the clutch gear 5. Provided on the rear face of the plate is a pin 28 supporting a pawl 29 whose tip is in facing relationship with the teeth of the ratchet wheel 11 and which is acted on by a spring 30 for urging the pawl tip into engagement with the teeth of the ratchet wheel 11. The arrangement is such that when the plate 27 is retracted to the left by the spring 31 as shown in FIG. 3, the slanting side 29a of the pawl 29 is held in contact with a pin 2e fixed to the film back to keep the pawl tip disengaged from the teeth of ratchet wheel 11, but the multiple exposure plate 27, if pushed rightward, allows the tip of pawl 29 to engage with the teeth of the ratchet wheel 11 to cause the wheel to turn in the counterclockwise direction (about 20° in this embodiment) as the plate moves rightward.

Pivoted on the pin 2c supporting the operation lever 22 and pawls 23, 24 is a release lever 32 for freeing stoppage of winding action which has an end 32a facing a pin 25 on the lever 22 and which is urged in counterclockwise direction in the drawings by a spring 32b, the release lever 32 serving to disengage the bent end portion 22a of the operation lever 22 from the cutout portion 20b of the operation plate 20 in operative relationship with shutter release action to be described later.

Numeral 33 indicates a double exposure prevention lever pivoted on a pin 2f fixed to a front panel 2h of the film back 2 and urged in the counterclockwise direction by a spring 33a, a downwardly extending arm 33b being in contact with an end portion 22b of the operation lever 22 so that the prevention lever 33 may be moved pivotally on the pin 2f interrelatedly with the action of the operation lever 22. Actuating arm 33c of the double exposure prevention lever 33 is supported by a guide plate 34 secured to the front panel 2h so as to be moved only in vertical direction. The vertical pivotal movement of the actuating arm 33c serves to open or close a window 2i formed in the front panel 2h; the bent end portion 22a of the operation lever 22, when brought into engagement with the cutout portion 20b of the operation plate 20, allows the actuating arm 33c to open the window 2i and when the bent end portion 22a is moved out of the cutout 20b, the actuating arm 33c closes the window 2i.

Designated at 35 is a shutter release lever provided in the camera body. The end of the shutter release lever 35 is disposed close to the window 2i in the front panel 2h of film back 2. Upon shutter release, the release lever 35 is urged leftward in the drawings to project into the film back 2 through the window 2i and push the tail end 32c of the release lever 32 disposed in front of the window 2i against spring 32b, with the result that the release lever 32 is pivotally moved on the pin 2c in the clockwise direction. Due to this pivotal movement, the release lever 32 pushes pin 25 on the operation lever 22 with its forward end 32a thereby moving the lever 22 and pawls 23, 24 pivotally in clockwise direction to disengage the bent end portion 22a from the cutout 20b and pawls 23, 24, respectively from ratchet wheels 11, 17. Simultaneously with this, the double exposure prevention lever 33 is returned by the spring 33a in such direction that the window 2i is closed. At this time, the shutter release lever 35 is still projected through the window 2i in the film back 2. The actuating arm 33c is provided, at its tail end, with an upper projection 33d which is positioned beside the window 2i, the projection being so adapted as to receive the tail end 32c of the stoppage release lever 32 which is being returned counterclockwise by the spring 32b due to the restoring movement of the shutter release lever 35, lest the tail end 32c should strike directly against the front panel 2h to interfere with the above-mentioned returning movement of the double exposure prevention lever 33.

Numeral 36 indicates a multiple exposure lever pivoted on a pin 2g and urged by a spring 36a in clockwise direction, the bent portion 36b thereof facing to a bent edge 27c formed at a projecting end of the multiple exposure plate 27 so that the lever may be moved pivotally by the bent edge 27c when the multiple exposure plate 27 is urged rightward in FIG. 3. Pivoted at the actuating end 36c of the lever 36 is the base end of a multiple exposure actuator 37 which is disposed along the inner surface of the front panel 2h. The forward end of the multiple exposure actuator 37 is positioned close to the lower end of arm 33b, downwardly extending from the pin 2f, of the double exposure prevention lever 33. Accordingly, the exposure plate 27, when moved rightward in FIG. 3, causes the exposure lever 36 to move pivotally in counterclockwise direction on the pin 2g and the actuator 37 therefore pushes the double exposure prevention lever 33 into clockwise pivotal movement on the pin 2f to open the window 2i of the front panel 2h. The actuating arm 33c of the lever 33 is now at a lower position to enable the shutter release lever 35 to project through the window 2i into the film back 2. The movement of the double exposure prevention lever 33 at this time is effected independently of the operation lever 22.

Figure 7:
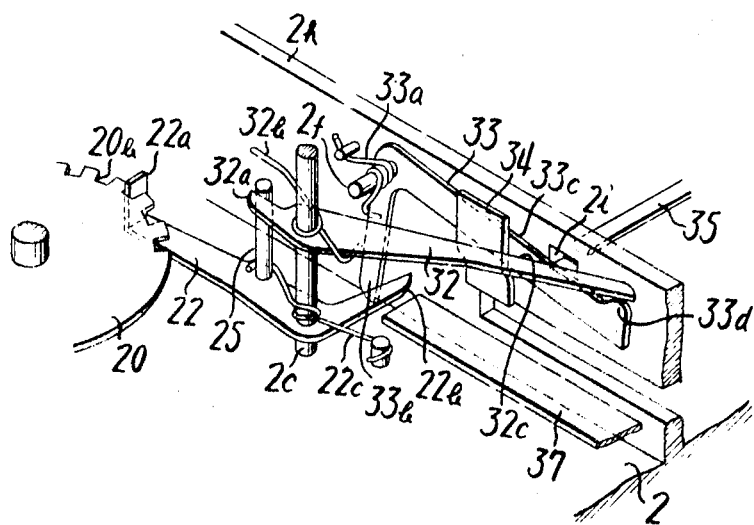
FIG. 7 is a perspective view showing the principal parts in FIG. 4.

With the foregoing arrangement, when the film winding knob in the film back 2 loaded with a film is turned, the first film winding gear 16 is rotated together with shaft 16a and by way of the first idle gear 18, kick spring 19a, second idle gear 19 and second film winding gear 15, the spool turning gear 14 is rotated to revolve an unillustrated spool gear and to wind up the film. When the film is wound up, the friction roller 21b is rotated interrelatedly with the movement of the film, resulting in rotation of the friction roller gear 21a to rotate the counter gear 21 and operation plate 20. After the leader portion of the film has been advanced and the film is made ready for exposure, the bent end 22a of operation lever 22 is urged into the cutout portion 20b of operation plate 20 by known means. Simultaneously with this, the tips of pawls 23, 24 are brought into engagement with the teeth of ratchet wheels 11, 17 respectively to halt the film winding operation. On the other hand, the end portion 22b of operation lever 22 caused the double exposure prevention lever 33 to move pivotally in clockwise direction by pushing its end 33b, whereupon the window 2i in the front panel 2h is opened as shown in FIG. 7. The film back 2 is now ready for making an exposure. The film winding operation described above may be carried out with the film back 2 alone before it is mounted on the body 1, or it may be performed after the film back 2 has been mounted on the body 1.

In this manner the film back 2 is attached to the body 1, the camera being ready for exposure if the shutter has already been set in the body.

In case where the shutter is not in set position, the winding knob in the body 1 is turned to bring the shutter into the cocked position. Upon shutter setting, the partly toothless gear 4 is rotated to complete setting through one turn of its rotation. Simultaneously with this movement, the clutch gear 5 also performs the reciprocating rotational movement as already described. However, since the film winding operation has already been completed in the film back, with the operation lever 22 engaged with the operation plate 20, ratchet wheels 11, 17 being prevented from rotation, film winding is consequently prevented. On the other hand, the clutch pawl 8 pivoted on the pin 7 on the clutch gear 5 has its tail end 8a caught in the recess 11a of ratchet wheel 11 and its pawl tip held in engagement with the teeth of ratchet wheel 13, but because the clutch gear 5 alone begins to revolve in clockwise direction, with the ratchet wheel 11 prevented from rotation as above described, the tail end 8a of clutch pawl 8, disengaged from the recess 11a, is brought into sliding contact with the cylindrical surface of the ratchet wheel 11 with its pawl tip freed from engagement with the ratchet wheel 13, so that the clutch gear 5, now free to rotate relative to the ratchet wheel 13, is driven into reciprocating rotation. During a very short period between the initiation of the forward rotation of the clutch gear 5 and the disengagement of the tail end 8a of clutch pawl 8 from the recess 11a, the pawl 8 is still held in engagement with the ratchet 13, which effects slight rotation of the ratchet wheel 13, further causing the spool turning gear 14 to revolve slightly for film transport. The amount of advance, however, is as small as about 1 mm. with a film of 6 ×6 cm. size and there arises no trouble in practical use. Although the rotation of the ratchet wheel 13 results in the rotation of the second film winding gear 15 and second idle gear 19, the first idle gear 18 will not be driven since the kick spring 19a interposed between the second idle gear 19 and first idle gear 18 does not transmit the torque of the former to the latter. When the clutch gear 5 is returned in counterclockwise direction under the action of spiral spring 5a after the gear has been disengaged from the gear 4 upon the shutter being cocked in position, the clutch pawl 8 is moved into engagement with the recess 11a at its tail end to cause the pawl tip to engage the ratchet wheel 13.

Figure 6:
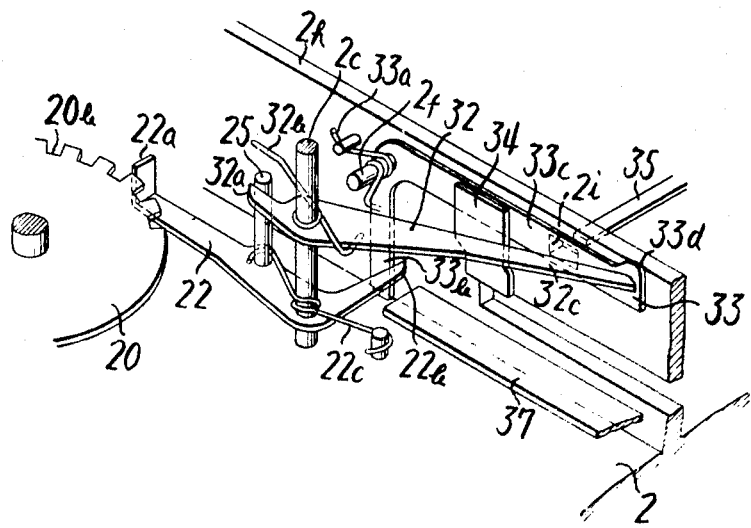
FIG. 6 is a perspective view showing the principal parts in FIG. 3.
Figure 8:
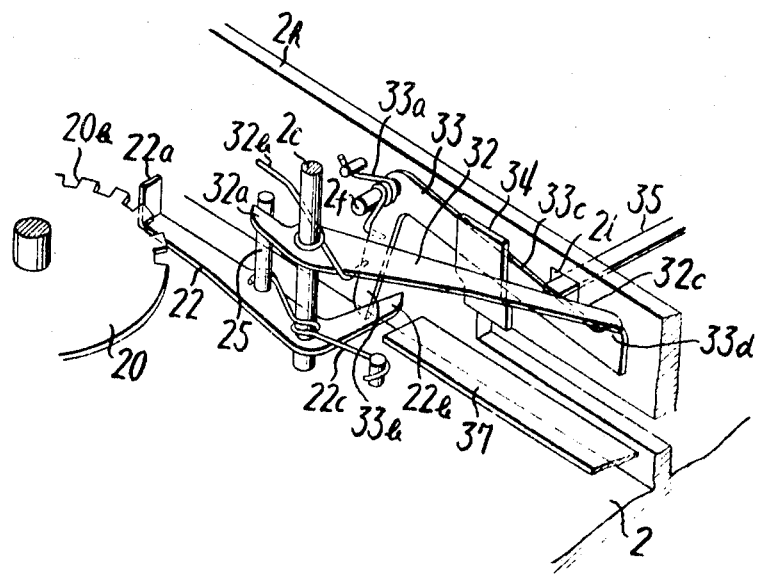
FIG. 8 is a perspective view showing the parts as the shutter is being released.

When shutter is released to subject the film to exposure, the shutter release lever 35 is projected through the window 2i into the film back 2 to pivotally move the stoppage release lever 32 in clockwise direction as shown in FIG. 8, whereupon the operation lever 22, pawls 23, 24 are rotated clockwise through the pin 25. The parts are now returned to the condition ready to effect film winding as seen in FIGS. 3 and 6. The shutter release lever 35 is returned toward the body 1 and the window 2i is closed by the double exposure prevention lever 33.

In the detailed description above, two cases are explained, one in which a new roll of film loaded in the film back 2 is wound up so as to be ready for exposure, with the shutter already in cocked position in the body 1 and the other in which the shutter has not been set in position. To sum up:

1. If the film has been wound up in the film back with the shutter in cocked position in the body, shutter release can be effected upon attachment of the film back to the body;

2. In case where the film has been wound up in the film back with the shutter still in the unset position in the body, the shutter can be made ready for release action without effecting film winding, if the shutter is brought to the cocked position;

3. In case where the shutter in the body is already in cocked position but the film has not yet been wound up in the film back, the film winding knob in the film back will be turned and the film will be wound up by one frame so as to make the camera ready for taking a photograph, since the winding knob in the body does not revolve in this case; and 4. In case where the film in the film back has not been wound up nor has the shutter been brought to the cocked position in the body, shutter setting and film winding will simultaneously be effected by turning the winding knob in the body as will be described below.

The following explanation will also apply to the case where after the above procedures (1) to (3) have been followed, a second frame or the subsequent frames of the film are to be subjected to exposure.

Figure 4:
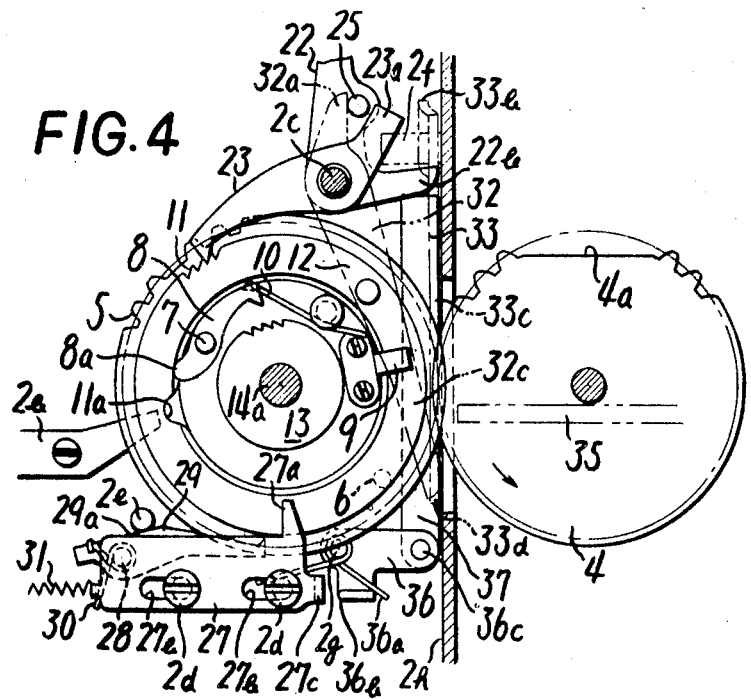
FIG. 4 is a plan view showing the principal parts after the film has been advanced by a predetermined length.

If the film in the film back has not been wound up nor has the shutter been brought to the cocked position, the respective members described above are in the positions illustrated in FIGS. 3 and 6. Accordingly, the winding knob in the body, when turned, causes the gear 4 to move into meshing engagement with the clutch gear 5. Since the clutch pawl 8 pivoted on the clutch gear 5 is in engagement with the ratchet wheel 13, the spool rotating gear 14, second film winding gear 15, and second idle gear 19 are driven along with the clutch gear 5, while the friction roller 21b, friction roller gear 21a, counter gear 21 and operation plate 20 are also rotated interrelatedly with the film as it is advanced. It is so arranged that the operation to wind up the predetermined length of film corresponding to one frame may be completed by approximately two-thirds the revolution of the ratchet wheel 13, while shutter setting is effected by one turn of rotation of the gear 4. Consequently, before one turn of the gear 4 is completed, approximately two-thirds the turn of rotation of ratchet wheel 13 is completed for winding up one frame of the film, and in operative relationship with this, the stopper which holds the operation lever 22 in the position shown in FIG. 3 is released by known means, whereupon the bent end 22a of operation lever 22 is urged into engagement with the cutout portion 20b to prevent the operation plate 20 from rotation, the pawls 23, 24 respectively acting to prevent the ratchet wheels 11, 17 from revolving. The double exposure prevention lever 33 opens the window 2i. On the other hand, the clutch gear 5 is still being driven by the gear 4, since it can not be disengaged from the gear 4 before the gear 4 completes one turn of rotation. As a result, the clutch pawl 8 on the clutch gear 5 moves round the spool drive gear shaft 14a along with the gear 5 and is disengaged from the ratchet wheel 13, with its tail end 8a brought out of the recess 11a into sliding contact with the inner cylindrical surface. Thus, the ratchet wheel 13 for transmitting winding action comes to a halt. This state is illustrated in FIGS. 4 and 7. At this stage, the clutch gear 5 rotates independently of the ratchet wheels 13, 11, and upon the gear 4 completing a turn of rotation, the clutch gear 5 is disengaged from the gear 4 and returned in counterclockwise direction under the action of spiral spring 5a. At a position slightly ahead of the position shown in FIG. 4 toward the counterclockwise returning direction the stopper 9 is initiated into pressing contact with the pin 12 on the ratchet wheel 11, whereupon the tail end 8a of the clutch pawl 8 engages the recess 11a, but the clutch gear 5 further continues to rotate until the stopper pin 6 on the rear face of the gear 5 strikes on the stopper 2b. During this counterclockwise rotation the ratchet wheel 11 is held in engagement with the pawl 23 and the ratchet wheel 13, in engagement with the clutch pawl 8, but since the clutch gear 5 and ratchet wheel 11 move counterclockwise, the counterclockwise movement can be effected in spite of the engagement. Although the first film winding gear 16 is free to rotate in counterclockwise direction, the first gear 16 is prevented from rotation because the clutch pawl 8 is in sliding contact with the ratchet wheel 13.

It will be apparent from the description above that in case where film winding and shutter setting have not been made, or further when second frame of film or subsequent frames of film are to be wound up, shutter setting and film winding can simultaneously be conducted by turning the winding knob in the body. Shutter release, when effected in this state, makes an exposure, with the result that the bent end 22a of operation lever 22 is disengaged from the cutout 20b in operation plate 20 and the pawls 23, 24 are respectively freed from engagement with the ratchet wheels 11, 17 into pivotal movement. Interrelatedly with the action of operation lever 22, the double exposure prevention lever 33 blocks the window 2i so as not to allow the shutter release lever 35 to project into the film back 2, thereby making it impossible to effect shutter release so long as the subsequent winding operation is conducted, hence prevention of an inadvertent double exposure. The parts are now in the state illustrated in FIGS. 3 and 6 and are ready for next shutter setting and film winding operations.

Figure 5:
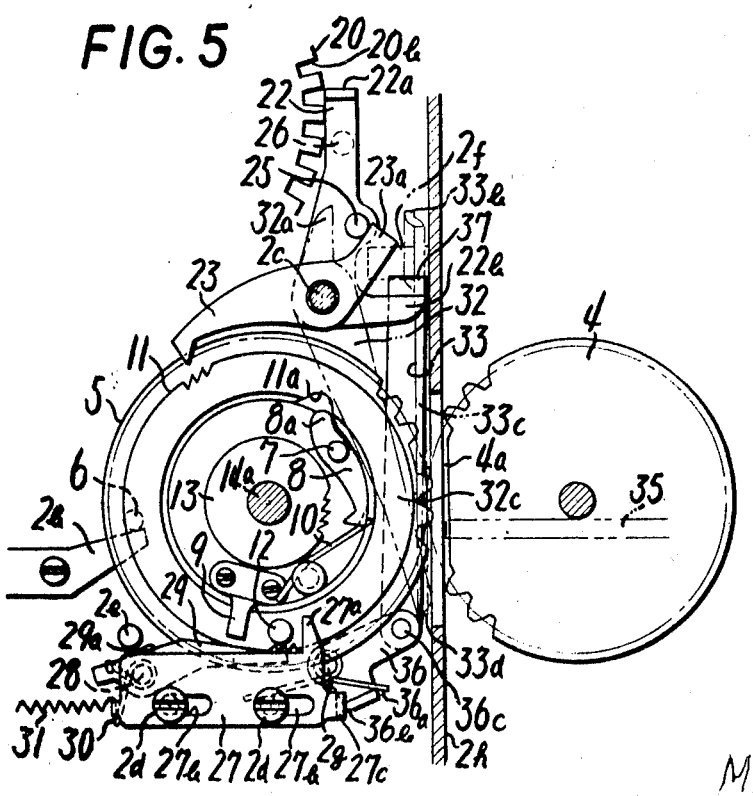
FIG. 5 is a plan view showing the principal parts as they are set for effecting multiple exposures.
Figure 9:
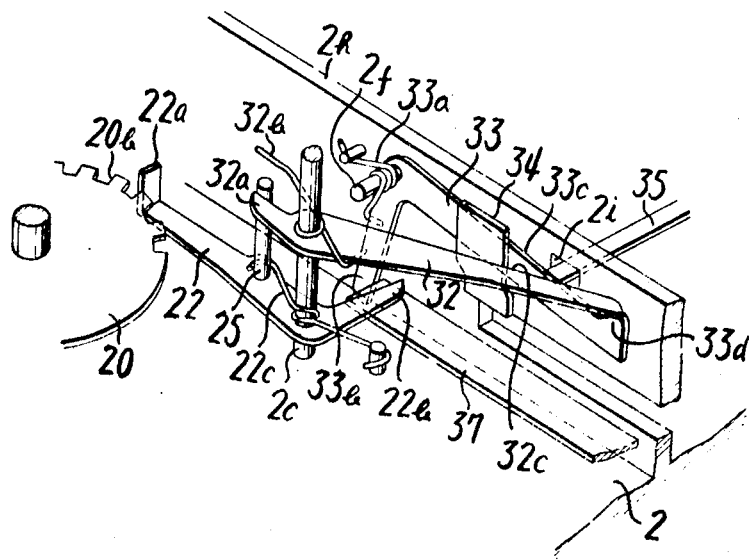
FIG. 9 is a perspective view showing the principal parts in FIG. 5.

The procedure to make a multiple exposure will be described below. As apparent from the description above, FIG. 3 illustrates the state after the shutter has been released for exposure. When the multiple exposure plate 27 in the position illustrated in FIG. 3 is pushed rightward against the action of the pulling spring 31 by an operating member (e.g., push-button or lever) outside the camera frame, the pawl 29 pivoted on pin 28 on the plate 27 as shown in FIGS. 5 and 9, is also urged rightward, the slanting side 29a of the pawl 29 thereby being disengaged from the pin to e on the film back 2, and under the action of the spring 30 the pawl 29 is moved pivotally counterclockwise into engagement with the ratchet 11 to drive the ratchet wheel 11 in the counterclockwise direction as the plate 27 moves further rightward. On the other hand, since the clutch gear 5 is prevented from moving in counterclockwise direction by the stopper 2b, the tail end 8a of the clutch pawl 8 is forced out of the recess 11a in the ratchet wheel 11 so that the clutch pawl 8 gets released from the ratchet wheel 13, while the bent edge 27c, pushing the bent portion 36b of the multiple exposure lever 36 against the spring 36a, causes the lever 36 to rotate in counterclockwise direction on pin 2g and further pushes the multiple exposure actuator 37 pivoted at the forward end of the lever 36 and disposed along the front panel 2h. The forward end of the actuator 37 now pushes the lower end of arm 33b of the double exposure prevention lever 33, which is therefore moved pivotally on pin 2f. The actuating arm 33c now opens the window 2i to allow the shutter release lever 35 to project into the film back 2.

The winding knob in the body 1, when turned at this stage, drives the charge gear 3, and the gear 4 and clutch gear 5 meshing with each other are also driven to wind up the spiral spring 5a. During the clockwise rotation at this time of the clutch gear 5, the clutch pawl 8 is held out of engagement with the ratchet wheel 13 with its tail end 8a in contact with the inner cylindrical surface of the ratchet wheel 11, so that the clutch gear 5, driven by the gear 4, performs idle rotation except that it winds up the spiral spring 5a. Upon the completion of shutter setting during one revolution of the gear 4, the clutch gear 5 is moved backward in counterclockwise direction until it is stopped at the position defined by the stopper 2b, shutter setting alone thus being effected without carrying out film winding operation. Since the window 2i in the front panel 2h is left open, the shutter when released subjects the film already exposed to a second exposure to obtain a superimposed photograph. If such procedure is further repeated multiple exposures such as triple exposure can be made.

When the external operating force is removed, the multiple exposure plate 27 is urged backward under the action of pulling spring 31. Since the slanting side 29a comes into contact with the pin 2e, the pawl 29 is moved in clockwise direction on the pin 28 as the plate 27 is returned to the original position, whereby it is freed from the engagement with the ratchet wheel 11. The pin 12, being pushed by the projection 27a of the plate 27, allows the ratchet wheel 11 to move clockwise until it is brought to a halt with pin 12 pinched between the stopper 9 of clutch gear 5 and projection 27a. The tail end of the clutch pawl 8 engages the recess 11a to urge the clutch 8 into engagement with the ratchet wheel 13. Under the action of spring 36a, the multiple exposure lever 36 and actuator 37 are returned to release the double exposure prevention lever 33, which is then restored to the original position by spring 33a to block the window 2i with its actuating arm 33c. The respective members are now restored from the positions in FIGS. 5 and 9 to the positions illustrated in FIGS. 3 and 6.

By adding an extremely simple structure, the present invention as described above has provided a multiple exposure mechanism which has conventionally been regarded as impossible to incorporate in a camera having an interchangeable film back in which shutter setting and film winding are simultaneously effected. In addition, the present invention has advantages that the film back can be mounted on the body irrespective of the state of the film loaded in the film back and regardless of whether the shutter is in cocked position or not; in spite of these advantages, the camera is free from erroneous operations such as a double exposure or transport of an unexposed frame which are liable to take place due to the combination of the mating parts; during film transport, shutter release is prevented thus indicating that the film is not in the normal condition ready for exposure; and these features are provided by mechanisms which are no more complex than those in conventional cameras. Thus, the present invention gives epochmaking functions to cameras of such type and makes them more serviceable.

In the embodiment above, instead of the clutch gear 5, a rotary member may also be used which rotates a definite angle reciprocally in operative relationship with the winding knob in the body which is rotated a definite angle.

What is claimed is:

1. In a photographic camera including a main body and a removable film magazine, the main body comprising:
  a shutter charge means and
  a first transmission mechanically connected to said shutter charge means; the film magazine comprising:
  a manually operated film winding member;
  a second transmission;
  a film spool driving member interconnected with said winding member through said second transmission;
  a ratchet member mechanically connected to said film spool driving member;
  an intermediate member engageable with said first transmission with the charging operation of said shutter charge means and biased to return to a retracted position when disengaged from said first transmission;
  a pawl member pivotally mounted on said intermediate member and biased to engage with said ratchet member and prevent the latter from moving relative to said intermediate member in a direction reverse to that for film winding-up;
  a control member mounted on said intermediate member so that one of them is independently movable relative to the other when said other is stopped and both are movable together when they are respectively free;
  a latch member positioned to engage with said control member and prevent the latter from moving in a film winding-up direction when a film has been wound up;
  said control member disengaging said pawl member from said ratchet member when relative displacement occurs between said control member and said intermediate member and the amount of the relative displacement being not less than that of the movement of said intermediate member; and
  means for restoring the relationship between said control member and said intermediate member.

2. The mechanism as set forth in claim 1, wherein said film magazine comprises
  means including a second latch member for stopping the manually operated member when the film has been wound up.

3. The mechanism as set forth in claim 1, wherein said second transmission includes
  means for transmitting the movement of said second transmission only in one direction.

4. The mechanism as set forth in claim 1, wherein said first transmission includes
  a gear having a toothless portion; and
  said intermediate member includes a circular plate having a gear portion on the circumference thereof which registers with said partially toothless gear, and is disengaged from said partially toothless gear when in registry with said toothless portion.

5. The mechanism as set forth in claim 1, wherein said control member consists of an annular member having a ratchet on its circumference and an inner surface with a recess portion with which a portion of said pawl member is in slidable contact while said intermediate member and said control member are in normal relationship so that said pawl member may engage said ratchet member, said portion of said pawl member being in contact with another portion of said inner surface when said displacement occurs so that said pawl member may be disengaged from the ratchet member.

6. The mechanism as set forth in claim 1, wherein the main body comprises
  a sensing member projectable into the interior of the film magazine in response to shutter releasing operation; and
  said film magazine comprises
  a member responsive to the position of the advance of the film for preventing said sensing member from projecting into the film magazine.

7. The mechanism as set forth in claim 6, wherein the film magazine comprises
  a second latch member for stopping said manually operated member, and
  an operating member which operates on said latch members and said preventing member to move them into their stopping position when the film has been wound up.

8. The mechanism as set forth in claim 7, wherein said film magazine comprises
  a two-armed lever, a first arm of which confronts said sensing member and is movable by said operating member, a second arm of which urging said operating member to its rest position with the movement of said first arm.

9. The mechanism as set forth in claim 1, wherein said film magazine comprises
  manually operable means for effecting multiple exposure operable with said control member to permit displacement between said control member and said intermediate member.

10. The mechanism as set forth in claim 9, wherein the main body further comprises
  a sensing member projectable into the interior of said film magazine in response to shutter releasing operation;
  the film magazine further comprises
  a member for preventing the sensing member from projecting into the film magazine while the film is unwound,
  the multiple exposure effecting means including
  a manually slidable member biased towards its rest position,
  a pawl engageable with said control member to move the latter independently when said slidable member is manually moved against the bias, and
  an actuator member movable by said slidable member to retract said preventing member from its preventing position.

* * * * *